April 14, 1931. H. DE B. RICE 1,800,405
FOOTWEAR AND PROCESS OF MAKING THE SAME
Filed July 25, 1928
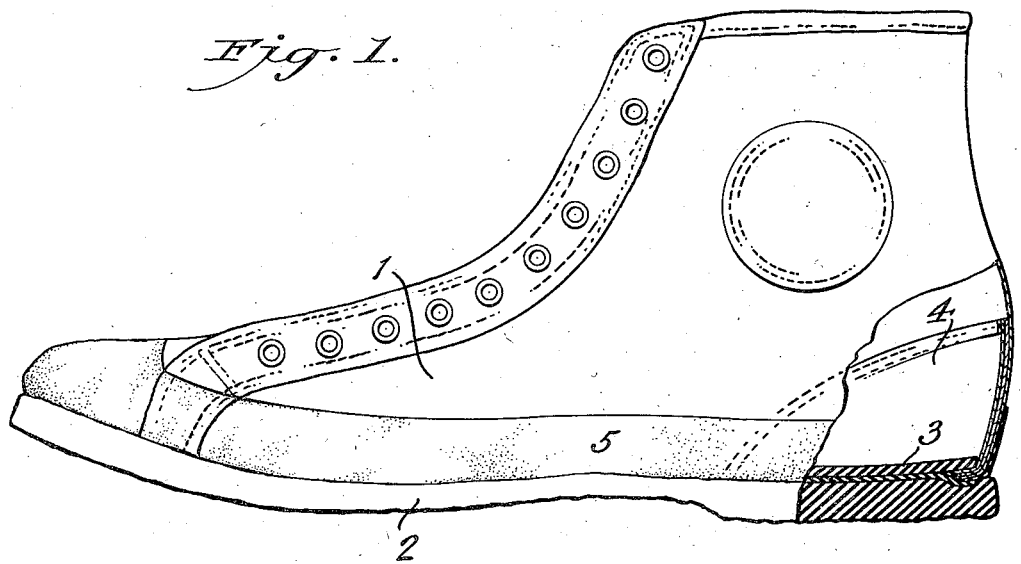
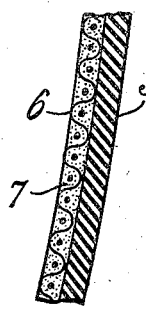
INVENTOR
Harold D. Rice
BY
ATTORNEY Patented Apr. 14, 1931

1,800,405

UNITED STATES PATENT OFFICE

HAROLD DE BLOIS RICE, OF BRISTOL, RHODE ISLAND, ASSIGNOR TO NATIONAL INDIA RUBBER COMPANY, OF BRISTOL, RHODE ISLAND, A CORPORATION OF RHODE ISLAND

FOOTWEAR AND PROCESS OF MAKING THE SAME

Application filed July 25, 1928. Serial No. 295,357.

This invention relates to a new process for the manufacture of footwear, especially tennis footwear, and the article thereby produced. The invention of this case is related to that of my copending application Serial No. 295,358, filed July 25, 1928.

It has been customary in the manufacture of tennis shoes to apply top cement to the lower inner margin of the canvas upper and allow such cement to dry so as to form a tacky surface. Similar cement is applied to the bottom of the insole and allowed to dry. The insole is placed on a last, the cemented portion of the upper is placed against the cemented portion of the insole and the upper drawn down over the last to remove wrinkles therefrom and to cause the upper and insole to adhere together. The next step in the manufacture of tennis shoes is to apply a band of marking cement around the lower side portion of the canvas upper and at the same time to apply cement over the lower part of the shoe consisting of the bottom edge of the upper and the bottom of the insole. This cement is allowed to dry and a second coat of cement is similarly applied. A foxing is then applied to the lower side portion of the upper, the cement serving to hold the foxing to the upper. A filler sole and an outsole is applied to the bottom of a shoe, and the shoe finished in the usual manner.

This method of building canvas shoes is open to certain objections. The marking cement applied to the outside of the upper consists of about 25% rubber compound and 75% solvent. When the cement is applied the solvent penetrates through the fabric of the upper and comes into contact with the top cement which was employed to unite the insole with the upper thereby frequently causing the separation of the insole and upper which necessitates the relasting of the shoe. This relasting operation must be done by hand and is accordingly an expensive and usually a poorly executed operation. Another fault of the above described method of building shoes is that due to the small percentage of rubber in the cement the adhesion between the rubber and the fabric is frequently not sufficient to hold securely the foxing to the upper, so that it frequently happens that the foxing will peel off the shoe after a short period of use. The inflammability, cost and toxicity of the solvent used in cements constitute further objections to the use thereof.

It is the object of my invention to provide a new process whereby the action of solvent upon the top cement which unites the upper and insole is prevented and at the same time greater adhesion is obtained between the rubber which unites the fabric with the foxing. It is also an object of my invention to lessen the cost of the manufacture of tennis footwear.

In carrying out my invention, after the upper and the insole have been united by top cement, a coat of latex or preferably of compounded latex is applied to the bottom of the insole and upper and along the lower side portions of the upper. This coat of latex is either allowed to dry at normal temperatures or may be dried at elevated temperatures or the solid constituents thereof may be caused to deposit by coagulation or in any other convenient and suitable manner. Next the regular coat of cement may be applied as described in connection with the usual method of building tennis shoes, and the foxing, the filler sole and the outsole applied thereover. However, instead of the usual second coat of cement, I may apply a second coat of latex or compounded latex over the first coat in the same manner as the second coat of cement was applied. This second coat of latex serves as a connecting medium between the foxing, the filler sole, the outer sole, and the upper and insole of the shoe. The coats of latex referred to may be applied either by being brushed on or by dipping or by devices similar to cementing machines or in any other suitable manner. The deposition of the solid constituents of the compounded latex may be effected as before stated by drying either at normal or elevated temperatures or by coagulation or in any other suitable manner. Instead of a layer of latex followed by either the layer of latex or cement a plurality of layers of either latex or of cement or of latex and cement alternately applied may be used to unite the first coat of latex with the foxing, the filler sole and the outsole. The foxing is of conventional construction.

The first coat of latex applied in the exterior of the upper is a water dispersion of rubber and compounding ingredients which contains approximately 52% of solids and is of great penetrating power. The fact that the dispersion medium in the case of latex is water avoids the separation of the insole and upper previously caused by the penetration of the fabric by the organic solvent used in the cement. Furthermore, after the solid constituents of the latex have deposited on the fabric further applications of cement do not cause the separation of the insole and upper since the nature of the unbroken down rubber obtained from latex is such that it prevents the solvent of the cement from penetrating the fabric. In addition to these advantages, a large percentage of solid constituents present in the compounded latex results in a heavy deposit of compounded rubber on the fabric so that a more secure union between the rubber and the fabric is obtained thereby resulting in greater adhesion between the foxing and the fabric which prevents peeling of the foxing above referred to. It has been found that by using a coat of latex followed by a coat of cement on which the foxing is then applied that the adhesion obtained was from 7–20% greater than that obtained when two coats of cement were used to unite the fabric and foxing. It has also been found that when two coats of latex are employed to unite the fabric and foxing that an increase in adhesion of from 7–30% is obtained compared with the adhesion obtained when two coats of cement are employed to unite the fabric and foxing.

The accompanying drawing shows an article of footwear.

Figure 1 shows an elevation, partly cut away, of an article of footwear embodying this invention; and Fig. 2 is a detailed cross sectional view showing an embodiment of this invention.

The article of footwear is composed of the upper 1, the sole 2, insole 3, heel reinforcement 4, and foxing 5. The foxing 5 is of calendered rubber composition, arranged around the lower margin of the upper, as shown in Fig. 1, and secured to the material of the upper which is usually fabric 6 by the deposit of latex 7 and applied in the manner and having the characteristics disclosed herein.

The compounded latex employed in carrying out my invention consists of:

| | |
|---|---|
| Rubber (23 gallons of latex 55% solids) | 100 lbs. |
| Water in latex | 81 lbs. 13 oz. |
| Sulphur | 4 lbs. |
| Condensation product of heptaldehyde and aniline | 5 lbs. 13 oz. |
| Nekal (sulphonated oil) | 1 lb. |
| Glue | 3 lbs. 8 oz. |
| Rosin oil emulsion | 20 lbs. 10 oz. |
| Whiting | 10 lbs. |

A sufficient amount of water is added to the above ingredients to bring the total solid content to approximately 52%. The latex used in the above composition is made from the pure latex by creaming with an agent such as alginate or Irish moss, which creaming operation greatly improves the tackiness of the latex and reduces the amount of water soluble material present. A small amount of oil of wintergreen (methyl salicylate) or something similar may be added to improve the odor of the rubber. The Nekal is a condensation product of an aromatic hydrocarbon with an aliphatic alcohol in the presence of sulphuric acid which serves as a preservative and also greatly increases the penetrating power of the latex. A satisfactory Nekal may be prepared from naphthalene, iso propyl alcohol and sulphuric acid, the sodium salt being used. This Nekal is a sulphonated oil in place of which chlorinated or nitrated oils might be used, which oils serve to increase the penetrating power of latex, although they might not serve as preservatives. The rosin oil emulsion serves as a softening agent and other suitable material such as paraffine oil and other mineral oil may be substituted therefor. The condensation product of heptaldehyde and aniline is added in the form of an emulsion and serves as an accelerator. Other accelerators may be substituted in the composition, such as diphenyl guanidine or other well-known accelerators. Other fillers may be added to the composition, such as zinc oxide and any desirable pigment may be used as convenient.

The assembled article may then be vulcanized in any of the suitable well known methods of vulcanization of such articles.

While the latex above referred to is in the form of creamed latex, other forms of latex, such as latex butter, vulcanized latex, pure latex, or compounded latex may be used in my process, and the term "water dispersion of rubber" used in the claims is intended to cover all such varieties of latex or other water dispersions of rubber either natural or artificial.

My process as above disclosed not only produces a superior article but the process in itself is more economical than that heretofore used inasmuch as it avoids to a large extent the use of cements which employ expensive solvents which cannot economically be recovered in manufacturing processes. The process above outlined requires very little labor, avoids the steps of milling the rubber and making the cement, thereby reducing the cost of building tennis footwear.

For an understanding of the scope of my invention reference should be made to the following claims.

Having described my invention, what I claim and desire to protect by Letters Patent is:

1. In the manufacture of footwear, the steps of cementing an insole to an upper, applying a water dispersion of rubber to the bottom of the upper and insole, causing the solid constituents of the dispersion to deposit thereon, and applying cement to the deposit of rubber to form a tacky surface.

2. In the manufacture of footwear, the steps of cementing an insole to an upper, applying latex to the bottom of the insole and to the bottom margin and the sides of the upper, drying the latex, and applying cement to the side portion of the upper to form a tacky surface.

3. In the manufacture of footwear, the steps of cementing an insole to an upper, applying a water dispersion of rubber to the lower side portion of the upper, causing the deposition thereon of the solid constituents of the dispersion, applying a calendered foxing to said lower side portion of said upper, and vulcanizing the foxing.

4. In the manufacture of footwear, the steps of cementing an insole to an upper, applying latex to the lower margin of the upper and to the bottom of the insole, causing the solid constituents of the latex to deposit thereon, applying cement to said lower margin of the upper, applying a foxing to said lower margin, and vulcanizing the foxing.

5. In the manufacture of footwear, the steps of cementing an insole to an upper, uniting a foxing to the lower margin of the upper with a deposit of latex, and vulcanizing the foxing.

6. In the manufacture of footwear, the steps of applying latex to the lower margin of an upper, causing the solid constituents of the latex to deposit thereon, applying a foxing to the latex deposit and vulcanizing the foxing.

7. In the manufacture of footwear, the steps of applying latex to the lower margin of an upper causing the solid constituents of the latex to deposit thereon, applying cement to the latex deposit, applying a foxing to the latex deposit, and vulcanizing the foxing.

8. In the manufacture of footwear, the steps of applying a plurality of layers of latex to the lower margin of an upper, causing the solid constituents of the latex to deposit thereon, applying a foxing to the latex deposit, and vulcanizing the foxing.

9. An article of footwear having an insole and an upper united by cement, a layer of rubber along the lower side margin of the upper, said rubber being composed of the solid constituents of a water dispersion of rubber deposited in situ, and a vulcanized foxing affixed to said layer of rubber.

10. An article of footwear having an insole and an upper united by cement, a deposit of the solid constituents of latex along the lower side margin of the upper, and a foxing vulcanized to the deposit of latex.

11. An article of footwear having an upper, a deposit of the solid constituents of latex on the lower margin of the upper, and a foxing vulcanized to the deposit.

12. An article of footwear having an upper and an insole, a deposit formed in situ of the solid constituents of latex on the bottom of the insole, and an outsole vulcanized to the deposit.

13. An article of footwear having an upper, a deposit of the solid constituents of latex on the lower margin of the upper, a vulcanized foxing, and a layer of cement uniting the foxing and the deposit.

14. An article of footwear having an upper and an insole, a deposit of the solid constituents of latex on the bottom of the insole and along the lower margin of the upper, a vulcanized outsole affixed to said insole, and a vulcanized foxing affixed to said lower margin.

Signed at Bristol, county of Bristol, State of Rhode Island, this 18th day of July, 1928.

HAROLD DE BLOIS RICE.